May 20, 1924.

J. W. DEBEN 1,494,344

SYRINGE

Filed April 9, 1923

INVENTOR.

BY Joseph W. Deben

King Harness
ATTORNEY.

Patented May 20, 1924.

1,494,344

UNITED STATES PATENT OFFICE.

JOSEPH W. DEBEN, OF DETROIT, MICHIGAN.

SYRINGE.

Application filed April 9, 1923. Serial No. 631,021.

*To all whom it may concern:*

Be it known that I, JOSEPH W. DEBEN, a citizen of the United States, and resident of the city of Detroit, county of Wayne and State of Michigan, have invented certain new and useful Improvements in Syringes, of which the following is a specification.

It is a primary object of my invention to provide a syringe of cheap and economical construction and having a movable plunger therein. It is a further object to provide such a construction adapted for easy and quick assembly as well as an assembly made up principally of non-metallic elements.

With these and other objects in view, my invention consists in the arrangement, combination and construction of the various parts of my improved device as described in the specification, claimed in my claims and shown in the accompanying drawings, in which:

Figure 1:
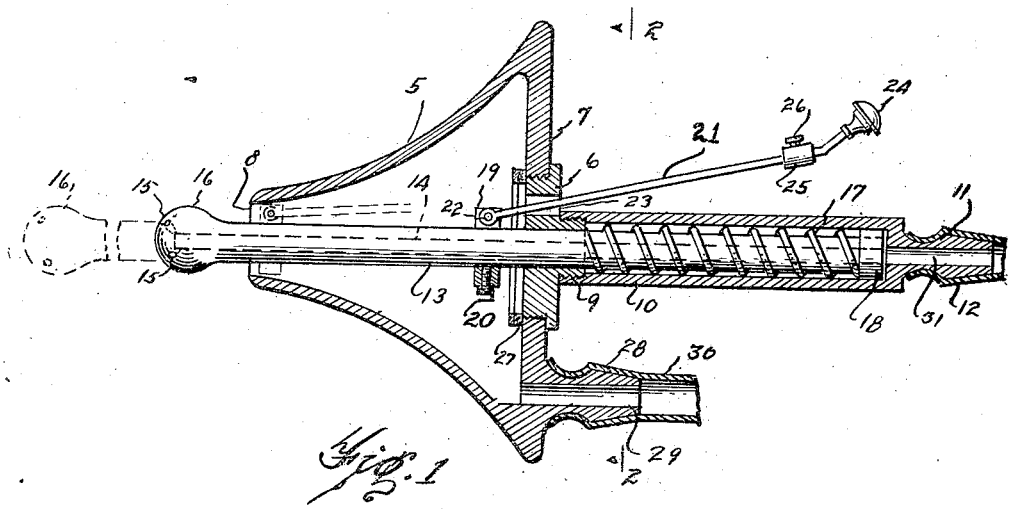
Fig. 1 is a central sectional view of my improved device.
Figure 2:
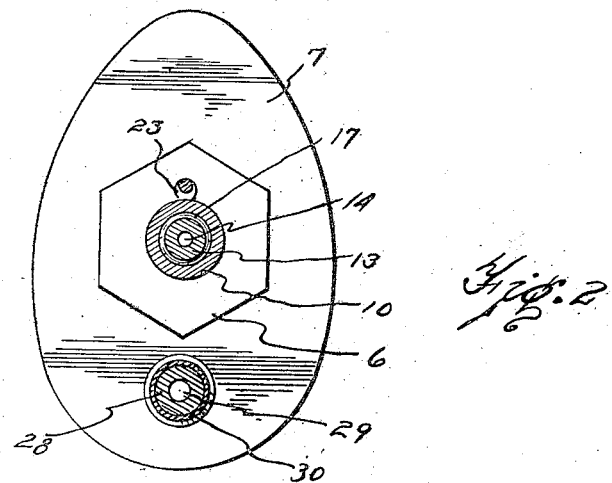
Fig. 2 is a view taken on line 2—2 of Fig. 1.

I have provided a bell shaped member 5 having a screw threaded nut 6 engaging a screw threaded aperture in the back portion 7 thereof and having an open end 8 at the forward end thereof.

The nut 6 is provided with a rearwardly screw threaded end 9 on to which a rearwardly extending member 10 is adapted to be assembled. The member 10 is provided with a shoulder 11 at its rearward end over which a hose 12 of flexible material, such as rubber, may be assembled.

Disposed partially within the member 10 and partially within the member 5 and extending through the nut 6 is a plunger 13 having an aperture 14 extending therethrough and terminating at its forward end in a series of small holes 15 provided in the enlarged end 16 of the member 13 so as to form a spraying nozzle.

Also disposed within the member 10 and around the plunger 13 is a coiled spring 17 bearing its forward end against the screw threaded end 9 of the nut 6 and at its rearward end against a shoulder 18 on the plunger 13.

Disposed around the plunger 13 within the portion 5 is a collar 19 secured thereon by a set screw 20 and having a rod or lever 21 secured thereto by the pin 22. The rod 21 extends rearwardly through an opening 23 in the nut 6, and is provided at its rearward end with a knob 24. Adjacent the knob 24 is an adjustable stop member 25 secured on rod 21 by means of a set screw 26.

In order to prevent escape of any liquid whatsoever from the inside of the member 5 through the screw threaded opening in the back portion 7 thereof, into which the nut 6 is screwed, I provide a felt washer 27 which may be disposed around the intersection of the aperture in the back portion 7 and the nut 6 and be secured to either of said members by means of pins, adhesive or any other desirable means.

Adjacent the bottom of the back portion 7 of the member 5, I provide a rearward extension having a shoulder 28 thereon and an aperture 29 therein whereby a rubber or other flexible hose connection 30 may be assembled thereon.

In practical operation of my improved device, the forward end of the member 5 together with the enlarged end 16 of the plunger 13 may be inserted in the member to be treated and liquid allowed to flow from a suitable receptacle through the hose 12, the apertures 31 and 14 and the nozzle holes 15. At the same time that this flow of liquid is taking place, the rod 21 may be operated by pressing on the handle 24 thereof with the result that the end 16 on the plunger 13 may be extended to its full length within the member being treated. This will naturally cause the contraction of the spring 17 so that when pressure upon the handle 24 is released, the plunger 13 will recede. Thus by alternately pushing and releasing the knob 24, the nozzle 16 may be alternately extended and retracted as desired. The stop 25 provided on the rod 21 may be adjusted so as to regulate the length of the movement imparted to the plunger 13 at will.

The liquid which has been expelled through the nozzle 16 may return through the open end 8 of the member 5 and flow out through the aperture 29 and hose 30 to a suitable receptacle which may be provided therefor.

It will be noted that the assembly of my improved device is relatively simple and that the coil spring 17, being disposed within the member 10, is substantially free from contact with the liquid. The amount of liquid which will pass forwardly of the shoulder 18 and externally of the plunger 13 will be inconsequential. This positioning of the spring also permits the forward end of the member 5 being open, thus cheapening materially the cost of manufacture and giving a less restricted flow to the return fluid.

It is obvious that various changes may be made in the arrangement, combination and construction of the various parts of my improved device without departing from the spirit of my invention and it is my intention to cover by my claims such changes as may be reasonably included within the scope thereof.

What I claim is:

1. A device of the class described, comprising a tapered member having one end thereof open and the other end thereof closed, an elongated member disposed rearwardly of said first member and connected thereto, a plunger extending within both said members and having a shoulder on its rearward end and a spring member disposed within said second member and around said plunger, means consisting of a rod having a longitudinal movement adjustor thereon, attached to said plunger for moving the same longitudinally, and means, including said shoulder, for causing said spring to contract when said plunger is extended longitudinally whereby said plunger will be returned by the action of said spring, and means for directing liquid through said plunger.

2. A device of the class described, comprising a hollow member having a relatively small forward end and a relatively large rearward end, a tubular plunger extending through openings in both said ends, a tubular member connected to said rearward end and enclosing the rearward end of said plunger, a coiled spring in said tubular member and surrounding said plunger, means for moving said plunger forward and means whereby said spring will cause said plunger to move backward.

3. A device of the class described, comprising a hollow member having a relatively small forward end and a relatively large rearward end, a tubular plunger extending through openings in both said ends, a screw threaded nut being disposed in the rearward opening and around said plunger, said nut having a screw threaded rearward extension, an interiorly screw threaded tubular member attached thereto, said tubular member enclosing the rearward end of said plunger, a coiled spring in said tubular member and surrounding said plunger, means for moving said plunger forward and means whereby said spring will cause said plunger to move backward.

JOSEPH W. DEBEN.